United States Patent
Green

(10) Patent No.: US 9,653,039 B2
(45) Date of Patent: May 16, 2017

(54) METHOD, APPARATUS AND SYSTEM FOR CHANGING TO WHICH REMOTE DEVICE A LOCAL DEVICE IS IN COMMUNICATION VIA A COMMUNICATION MEDIUM THROUGH USE OF INTERRUPTION OF THE COMMUNICATION MEDIUM

(75) Inventor: Martin Green, Shelton, CT (US)

(73) Assignee: THINKLOGICAL, LLC, Milford, CT (US)

( * ) Notice: Subject to any disclaimer, the term of this patent is extended or adjusted under 35 U.S.C. 154(b) by 704 days.

(21) Appl. No.: 13/433,970

(22) Filed: Mar. 29, 2012

(65) Prior Publication Data
US 2013/0262717 A1 Oct. 3, 2013

(51) Int. Cl.
G06F 3/00 (2006.01)
G06F 5/00 (2006.01)
G09G 5/00 (2006.01)
G06F 3/14 (2006.01)
G06F 21/82 (2013.01)

(52) U.S. Cl.
CPC .............. *G09G 5/006* (2013.01); *G06F 3/14* (2013.01); *G06F 21/82* (2013.01); *G09G 2370/24* (2013.01)

(58) Field of Classification Search
None
See application file for complete search history.

(56) References Cited

U.S. PATENT DOCUMENTS

| | | | |
|---|---|---|---|
| 8,706,921 B2 * | 4/2014 | Zadigian et al. ............. | 710/10 |
| 2002/0178411 A1 * | 11/2002 | Kohda .............. | H04L 12/2697 714/712 |
| 2004/0148391 A1 * | 7/2004 | Lake et al. .................... | 709/224 |
| 2005/0044186 A1 * | 2/2005 | Petrisor ......................... | 709/219 |
| 2005/0049976 A1 * | 3/2005 | Yang ............................... | 705/67 |
| 2005/0185654 A1 * | 8/2005 | Zadikian et al. ........ | 370/395.21 |
| 2006/0107295 A1 * | 5/2006 | Margis et al. ................. | 725/81 |
| 2006/0173781 A1 * | 8/2006 | Donner .......................... | 705/50 |

(Continued)

FOREIGN PATENT DOCUMENTS

WO 2008148191 A2 12/2008

OTHER PUBLICATIONS

EP Search Report for Application No. 13161543.7 issued Sep. 10, 2014, 6 pages.

*Primary Examiner* — Steven Snyder
*Assistant Examiner* — Christopher Bartels
(74) *Attorney, Agent, or Firm* — Cantor Colburn LLP

(57) ABSTRACT

A method, apparatus and system for changing to which remote device a local device is in communication via a communication medium, communicates with a matrix switch forming part of the system by interruption of the communication medium by the local device. Upon receipt of a unit of information via interruption of the communication medium, the matrix switch causes the local device to be in communication with another remote device other than the remote device that it was previously in communication. In one embodiment, the switching is to a next available remote device of a plurality of remote devices while in another embodiment, the matrix switch switches the local device to a switch configuration device for further communication therewith via the communication medium, thereby allowing the local device to select which other remote device it desires to be in communication.

33 Claims, 10 Drawing Sheets

(56) References Cited

U.S. PATENT DOCUMENTS

| | | | |
|---|---|---|---|
| 2006/0251419 A1* | 11/2006 | Zadikian et al. | 398/51 |
| 2009/0214221 A1* | 8/2009 | Li et al. | 398/136 |
| 2010/0215359 A1* | 8/2010 | Li et al. | 398/22 |
| 2011/0268443 A1* | 11/2011 | Adler | 398/58 |
| 2012/0173769 A1* | 7/2012 | Loo | G06F 3/1454 710/14 |
| 2012/0177361 A1* | 7/2012 | Hirano et al. | 398/1 |
| 2014/0056594 A1* | 2/2014 | Ding et al. | 398/136 |

\* cited by examiner

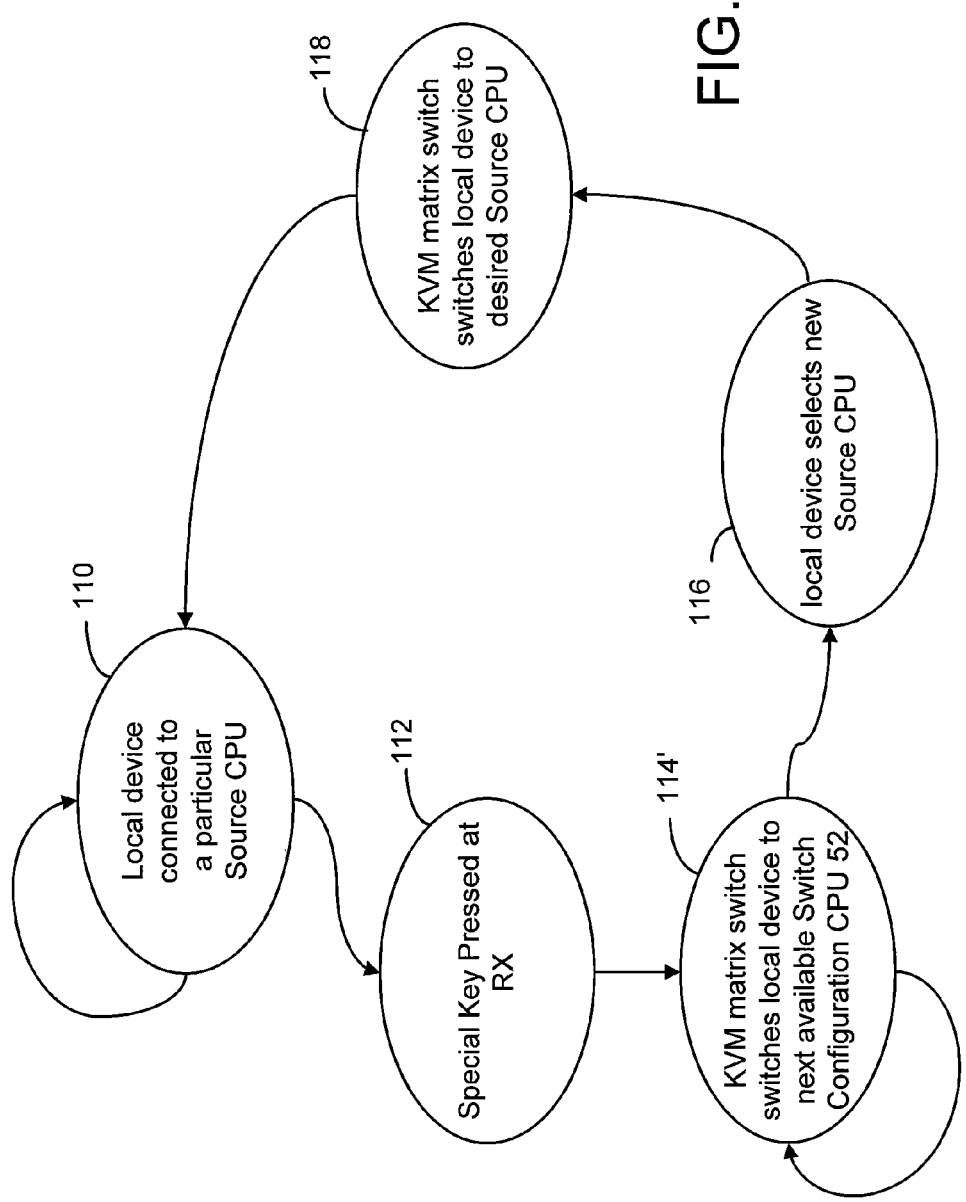

METHOD, APPARATUS AND SYSTEM FOR CHANGING TO WHICH REMOTE DEVICE A LOCAL DEVICE IS IN COMMUNICATION VIA A COMMUNICATION MEDIUM THROUGH USE OF INTERRUPTION OF THE COMMUNICATION MEDIUM

TECHNICAL FIELD

The present invention relates to keyboard, video, mouse (KVM) extension systems in conjunction with KVM matrix switches.

BACKGROUND OF THE INVENTION

Keyboard video mouse (KVM) extension systems are known in the art which allow for a KVM local device (destination user) to communicate with one of a plurality of remote devices (Source CPUs) by connecting the local device to a communication medium (such as a fiber optic cable) via a KVM receiver extender. The local device has a KVM receiver extender that connects to a first end of a communication medium. A second end of the communication medium connects to a KVM matrix switch. The KVM matrix switch connects the local device to a selected Source CPU. The Source CPU typically communicates to the KVM matrix switch via a KVM transmitter extender and a communication medium, such as a fiber optic cable. The KVM matrix switch is thus used to make the connections between the local devices (destination users) and the remote devices (Source CPUs). There is therefore a bi-directional communication path between each local device through the KVM matrix switch to a particular remote device.

There may be times when the local device wishes to communicate with the KVM switch so as to instruct the KVM matrix switch to connect it to a particular remote device. In controlled environments which prohibit the manipulation or insertion of data into the high speed communication medium data stream between the local device and the remote device, there have been relatively limited means for allowing a local device to communicate with the KVM matrix switch. There have been methods which employ use of a separate data connection between the local device and the KVM matrix switch, such as via use of an Ethernet, serial communication, USB communication or other communication path. However, this arrangement typically requires additional cables, interfaces and the like, and may introduce additional security issues.

One such method used in the art is a control device such as a switch configuration CPU which the local device (e.g., User CPU 23) can communicate with via an Internet connection (internet cloud 25). As seen in FIG. 1, the local device then can instruct a switch configuration CPU over the Internet to command the KVM matrix switch to connect the local device to a particular Source CPU. However, such an arrangement has its own security issues, including the use of the Internet to communicate with the switch configuration CPU as well as the need for the local device to have a CPU for communication with the Internet.

The present invention provides a solution to such security issues. It allows a local device to select a desired remote device (Source CPU) without the manipulation or insertion of data in the high speed data path of the communication medium between the local device and the remote device.

SUMMARY OF THE INVENTION

The present invention is directed to a method of communicating between a local device communicating via a communication medium configured to transmit high speed data to and from any one of a plurality of remote devices interconnected to the communication medium via a KVM matrix switch. The method, in response to a request from the local device, toggles a transmitter (typically forming part of a transceiver) connected to the communication medium On and Off in a pattern that represents a unit of information. The transceiver is configured to transmit high speed data via the communication medium at a first end of the communication medium, wherein the transceiver in turn interrupts the communication medium corresponding to the pattern. The detection of this pattern of interruption of the communication medium at its second end via the KVM matrix switch changes to which remote device of the plurality of remote devices the local device is in communication via the communication medium.

In an embodiment of this method, the transceiver communicating with the first end of the communication medium is a small form factor pluggable (SFP) transceiver. Another small form factor pluggable transceiver can be used at the second end of the communication medium. At the second end, a loss of signal (LOS) status output is used to detect interruption of the communication medium.

Furthermore, in another embodiment of the present invention, response to detection of the pattern of interruption of the communication medium causes the local device to be connected to a switch configuration device (e.g. a Switch Configuration CPU), which switch configuration device allows the local device to control to which Source CPU remote device it desires to be in communication, wherein the selection of such a remote device of a plurality of remote devices is performed via high speed data over the communication medium with the switch configuration device.

The present invention is also directed to a method of communicating comprising: in response to a request from local device, toggling a transmitter On and Off in a pattern that represents a unit of information, the transceiver configured to transmit high speed data via a communication medium at a first end thereof, the communication medium having the first end and a second end; the transmitter interrupting the communication medium at the first end corresponding to the pattern; detecting the pattern of interruption of the communication medium at the second end so as to determine the unit of information; and in response to the detection, changing to which remote device of a plurality of remote devices the local device is in communication via the communication medium.

A further embodiment of the present invention is the above method wherein the transmitter is toggled via a transmit disable input of the transmitter.

A still further embodiment of the present invention is the above method wherein the step of changing to which remote device of a plurality of remote devices that the local device is in communication comprises a plurality of devices ranging from 1 to N where N is a positive integer greater than 2 and wherein the changing to which device of the plurality of remote devices the local device is in communication is to the next sequentially higher or next sequentially lower device i, where i is a positive integer from 1 to N, depending upon a value of the unit of information.

Another embodiment of the present invention is the above method wherein at least one remote device is a switch configuration device and wherein the local device is connected to the switch configuration device if the pattern is detected.

A still further embodiment of the present invention is the above method wherein the switch configuration device communicates with an internal switch control of a matrix switch so as to allow the local device to select which of the plurality of remote devices it is to be in communication.

An additional embodiment of the present invention is the above method wherein the local device communicates with the switch configuration device via data transmitted over the communication medium rather than via interruption of the communication medium.

Another embodiment of the present invention is the above method wherein the local device communicates with the switch configuration device via data transmitted over the communication medium rather than via interruption of the communication medium.

A further embodiment of the present invention is the above method wherein in response to the detection of the pattern of interruption of the communication medium, the local device is connected to a switch configuration device in communication with the second end of the communication medium and when connected to the switch configuration device, the local device communicates therewith so as to select the next remote device of the plurality of remote devices the local device is in communication.

A still further embodiment of the present invention is the above method wherein the local device communicates with the switch configuration device by transmitting data via the communication medium rather than interruption of the communication medium.

Another embodiment of the present invention is the above method wherein the detecting the pattern of interruption of the communication medium at the second end so as to determine the unit of information is via an output signal of a receiver portion of a transceiver associated with the communication medium at its second end.

An additional embodiment of the present invention is the above method wherein the transceiver is a small form factor pluggable transceiver.

A further embodiment of the present invention is the above method wherein the output signal of the transceiver is a loss of signal (LOS) output status signal of the transceiver.

A still further embodiment of the present invention is the above method wherein the transmitter is part of a transceiver.

Another embodiment of the present invention is the above method wherein the transceiver has a transmit disable input and wherein the toggling of the transmit disable input changes a state of the transmit disable input for a minimum period of time necessary for interrupting the communication medium a period of time sufficient for allowing detection of the disruption at the second end of the communication medium.

Another embodiment of the present invention is the above method wherein the toggling of the transmit disable input for a sufficiently long period of time so as to allow for its detection at the second end of the communication medium as a bit of information of the unit of information.

A further embodiment of the present invention is the above method wherein the unit of information is an On and Off sequence that repeats for a minimum amount of times.

Another embodiment of the present invention is the above method wherein the steps are repeated for a plurality of local devices each communicating via a communication medium with one of the plurality of remote devices.

A further embodiment of the present invention is an I/O extender comprising: a transmitter, and an input module configured to receive a control request, the input module configured to toggle the transmitter On and Off in a pattern that represents a unit of information upon receipt of the control request from a local device; wherein the transmitter is connected to a first end of a communication medium and is configured to transmit high speed data via the communication medium, the transmitter in response to the toggling, interrupting the communication medium corresponding to the pattern.

A still further embodiment of the present invention is the above I/O extender, wherein the input module further comprises a transmitter disable input for receipt of the control request.

Another embodiment of the present invention is the above I/O extender, wherein the unit of information has a value to cause a matrix switch to connect the I/O extender to a second remote device different from a remote device to which the I/O extender is in communication prior to transmission of the unit of information.

A further embodiment of the present invention is the above I/O extender, further wherein the transmitter is part of a transceiver connected to the communication medium.

Another embodiment of the present invention is a communication system comprising: the above I/O extender and a matrix switch, comprising, a receiver configured to receive the high speed data via the communication medium at a second end thereof and having a loss of signal (LOS) status notification configured to detect interruption of the communication medium; an input module in communication with the LOS status notification and configured to detect the unit of information corresponding to the pattern of the detected interruption of the communication medium; a crosspoint switch, and a switch control in communication with the LOS status notification and configured to cause the crosspoint switch to change which remote device of a plurality of remote devices the local device is in communication.

A further embodiment of the present invention is the above-identified communication system, further comprising a switch configuration device remote device, wherein the switch control causes the crosspoint switch to cause the local device to communicate with the switch configuration device upon detection of the unit of information.

A still further embodiment of the present invention is the above-identified communication system, wherein the switch configuration device is configured to allow the local device to select which remote device it desires to communicate with, the switch configuration device configured to communicate such a selection to the matrix switch to cause the local device to be in communication with the selected remote device.

Another embodiment of the present invention is the above-identified communication system, wherein the receiver is part of a transceiver.

A further embodiment of the present invention is a transmitter comprising: a transmit disable input configured to be toggled On and Off in a pattern that represents a unit of information, the transmitter configured to transmit high speed data via a communication medium; and an input module in communication with the transmit disable input, the input module configured, in response to the toggling of the transmit disable input, to interrupt the communication medium corresponding to the pattern.

A still further embodiment of the present invention is the above transmitter, wherein the transmitter is part of a transceiver.

BRIEF DESCRIPTION OF THE DRAWINGS

For a full understanding of the nature and objects of the present invention, reference is made to the following detailed description taken in conjunction with the drawings in which:

FIG. 12 is another state diagram of a local device switching connection from one remote device to another remote device.

DETAILED DESCRIPTION

Figure 2:
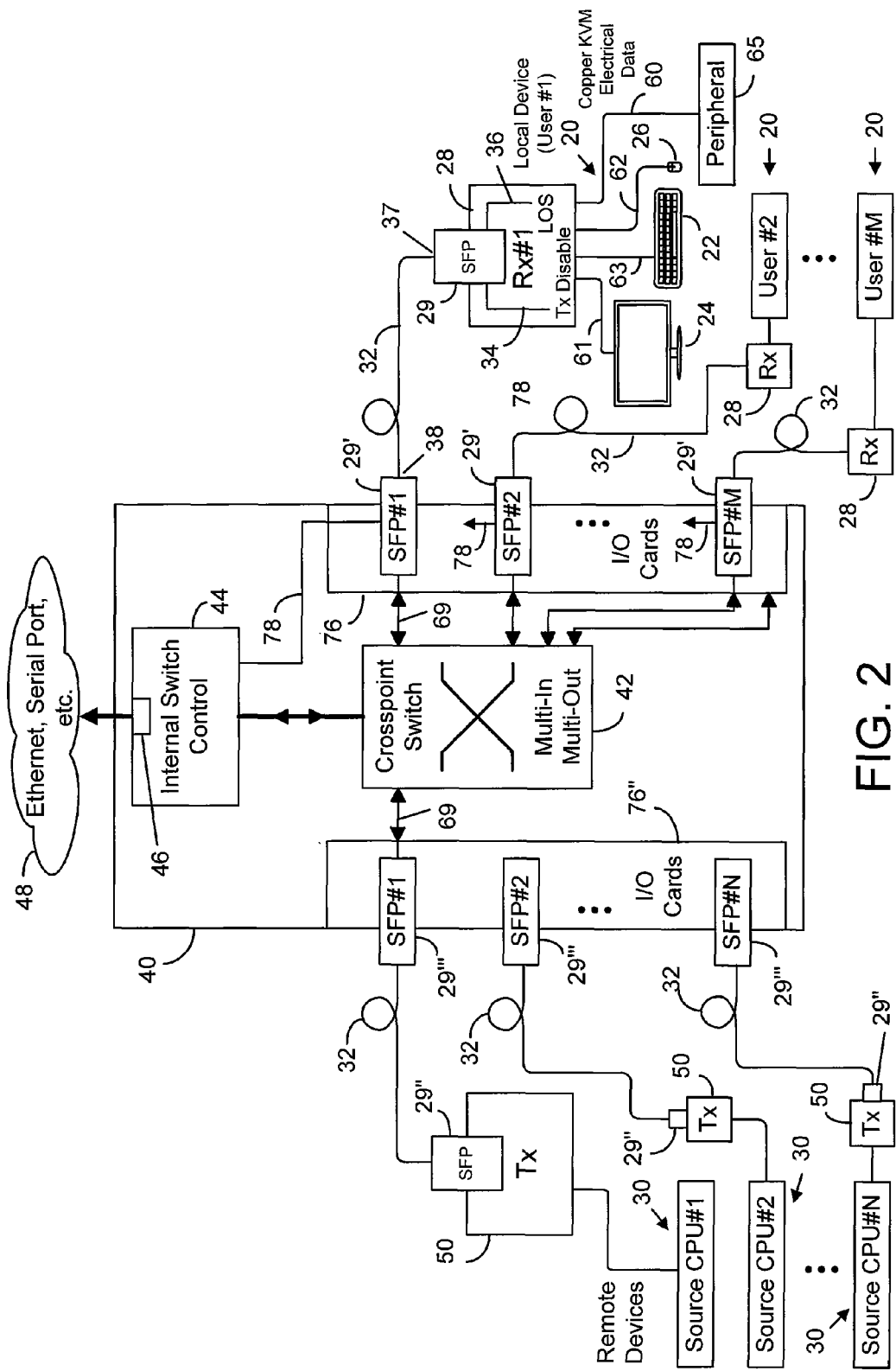
FIG. 2 is an overall architectural diagram of an embodiment of the present invention for allowing a local device (destination user) to switch from one Source CPU remote device to another.

As best seen in FIG. 2, the present invention is directed to a method and system of communicating between any one of a plurality of local devices 20 (sometimes referred to as destination users or local users) and any one of a plurality of remote devices, such as Source CPUs 30 and switch configuration device 52 (e.g. Switch Configuration CPUs 52—see embodiment shown in FIG. 3—), by use of a keyboard, video, mouse (KVM) matrix switch 40. Each local device typically has a keyboard 22, video monitor 24, and mouse 26 to allow the user to interact with a remote device 30 to which it is ultimately connected. Each local device also has a keyboard, video, mouse (KVM) receiver extender 28 which in turn typically includes a Small Form-factor Pluggable transceiver (SFP) 29. Such a transceiver is well-known in the art (see SFF Committee INF-8074i Specification for SFP (Smallformfactor Pluggable) transceiver, Rev. 1.0 dated May 12, 2001), and of course includes a transmitter 31 and a receiver 33 (see FIG. 5).

The pin definition of the SFP transceiver includes a TX Disable input 34 (transmitter disable input), as well as a LOS status notification (loss of signal) output 36 which indicates the status of the signal on an associated communication medium 32, such as an optical fiber communication medium.

As seen in FIG. 2, the RX extender 28 communicates via the communication medium 32 at a first end 37 with the KVM matrix switch 40 via communication medium 32. The matrix switch also includes a transceiver 29, typically a small form factor pluggable transceiver, communicating with each optical fiber communication medium at a second end 38 of the communication medium. These transceivers are typically located on one or more I/O cards 76. A typical example of such an RX extender is the Velocity Receiver™ KVM-24 of Thinklogical, 100 Washington Street, Milford, Conn. 06460-3133, USA.

Similar to each RX extender associated with each local device, a transmitter (TX) extender 50 is associated with each remote device 30. Each transmitter extender is configured in a manner similar to the receiver extender. Thus, each transmitter extender communicates via communication medium 32' with the KVM matrix switch 40, where the KVM matrix switch 40 includes a transceiver 29 for each transmitter extender having a configuration similar to the transceivers associated with the RX extenders. These transceivers may also be located on one or more I/O cards 76. A typical example of such a TX extender is the Velocity Transmitter™ KVM-24 of Thinklogical, 100 Washington Street, Milford, Conn. 06460-3133, USA.

As known in the art, the KVM matrix switch 40 provides the functionality necessary to make a connection between any local device 20 and any remote device 30. It performs this function by a crosspoint switch 42 under the control of an internal switch control 44. The internal switch control can include an I/O port 46 for connection to an external device via a network or other communication medium 48. A typical example of such a KVM matrix switch is the VX40™ KVM matrix switch of Thinklogical, 100 Washington Street, Milford, Conn. 06460-3133, USA.

Figure 1:
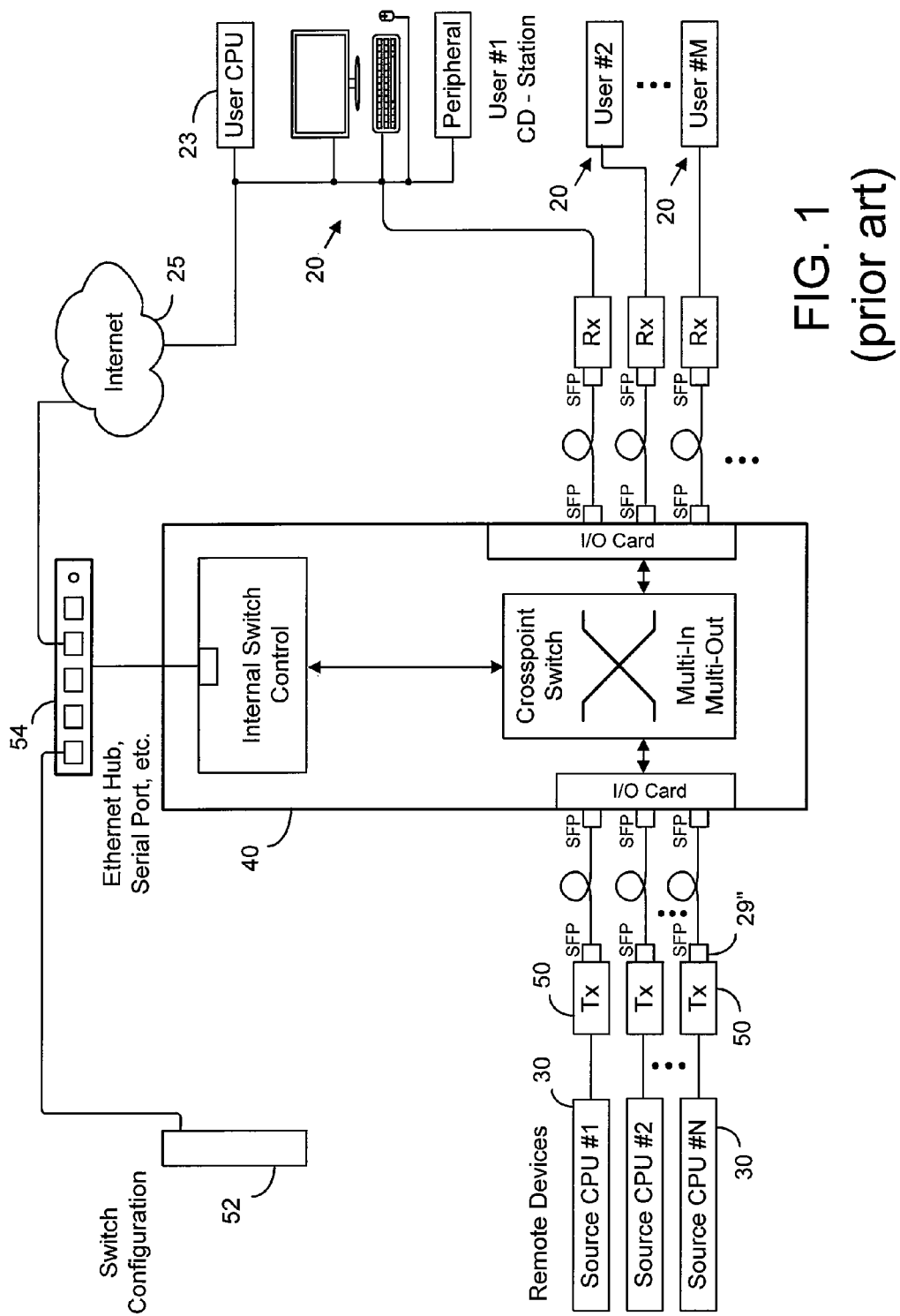
FIG. 1 is an overall diagram of the state of the art showing multiple local devices (destination users) each communicating with one of a plurality of remote devices (Source CPUs) by use of high speed communication medium in combination with respective transceivers and a KVM matrix switch and further showing control of the matrix switch by a switch configuration device.

In some prior art systems, it is permissible for a local device to communicate with a KVM switch via an external device, such as Switch Configuration CPU 52, which in turn communicates with the KVM switch through its internal switch control 44. In the prior art, as seen in FIG. 1, this has typically been done via a network 48. This causes security concerns since a local device may have its communications with the Switch Configuration CPU compromised. However, in many applications, especially applications requiring secure environments, it is impermissible for the local device to have such unsecured communications. It is also not permissible in some secure environments for the local device to insert control commands into the data stream on the high speed communication medium.

Figure 5:
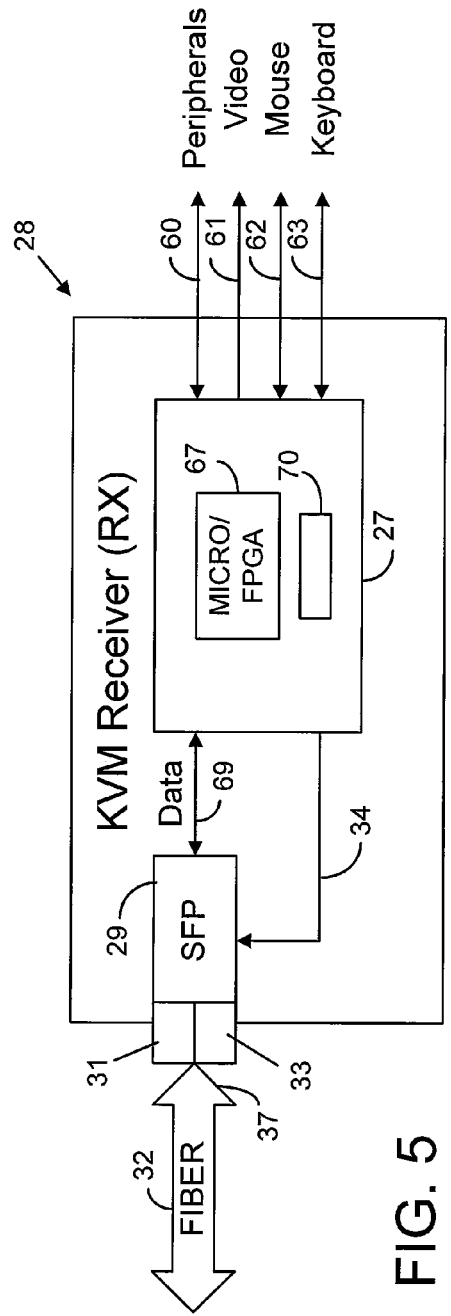
FIG. 5 is a block diagram of a keyboard, video, mouse receiver extender (RX) according to the present invention.

The present invention provides a solution to this problem by providing a mechanism that allows a local device to communicate with the KVM matrix switch in a manner that does not insert control commands into the high speed communication medium data stream and does not use a separate communication path between the local device and a Switch Configuration CPU. Details of the KVM receiver extender 28 are shown in FIG. 5. As there seen, the receiver extender 28 has a module 27 that includes interfaces 60, 61, 62, and 63 for interfacing with peripherals 65, video monitor 24, mouse 26, and keyboard 22, all of which form part of a local device 20, such User #1 shown in FIG. 2. The receiver extender includes a microprocessor or field programmable gate array (FPGA) 67 for communicating between peripherals, monitor, mouse, and keyboard associated with the local device and with high speed data 69 associated with the transceiver 29 for communication on the high speed communication medium 32, such as a fiber optic cable. The microprocessor and/or field programmable gate array 67 includes computer memory 70 for execution of instructions for performing the functions of the KVM receiver extender, including the specific functions discussed below. Such instructions can be hard wired within the field programmable gate array and thus the logical functions of the field programmable gate array can be commensurate with a microprocessor under program control where the program instructions are stored in computer memory 70.

The KVM transmitter extender 50 has a similar architecture as the KVM receiver extender.

Figure 6:
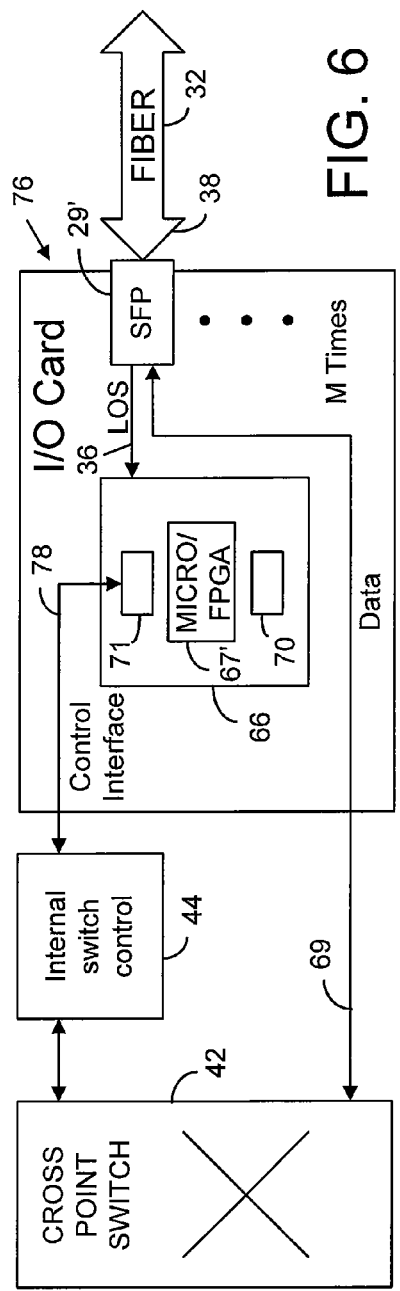
FIG. 6 is an overall block diagram of a portion of an I/O card associated with a KVM matrix switch of the present invention.
Figure 9:
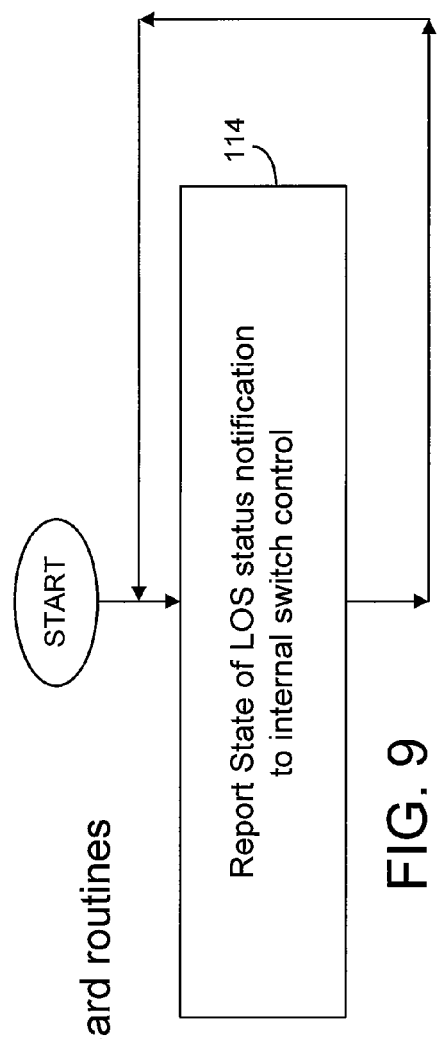
FIG. 9 is a flow chart of the operation of the I/O card associated with one of the local devices for a second embodiment of the present invention.

FIG. 6 is a block diagram of a portion of the input/output card 76 associated with the KVM matrix switch 40. As seen, the high speed communication medium 32 communicates with transceiver 29. The I/O card 76 includes an input module 66 having a microprocessor/FPGA 67' with associated memory 70 and also includes a control interface 78 for communicating control information with an internal switch control 44 of the matrix switch 40. This processor module is typically configured differently from the processor module 67 of the RX extender 28 shown in FIG. 5. The internal switch control in turn communicates with the multi-in/multi-out crosspoint switch 42 of switch 40 for making the interconnection between a particular local device 20 and a particular remote device 30. Thus, a particular local device, such as User #1 may communicate with any one of the N Source CPUs. This is true for the remaining users; i.e., User #2 . . . User #M, where M and N are positive integers.

As seen in FIG. 6, the LOS status notification signal 36 is communicated from transceiver 29 to the microprocessor/FPGA 67' for purposes of detecting loss of signal on high speed communication medium 32.

Methodology

An underlying concept of the present invention is the use of interruption of the communication medium as a technique for communicating with the KVM matrix switch so as to allow a local device to select which remote device communication is desired. Interruption of the communication medium is a loss of carrier. For an optical fiber, it is typically loss of optical power (see e.g., SFF Committee INF—listed above). For other types of communication medium it can be loss of carrier e.g. carrier frequency for a radio frequency communication) or loss of carrier (e.g. carrier frequency over a coaxial cable or twisted pair conductors).

Figure 7:
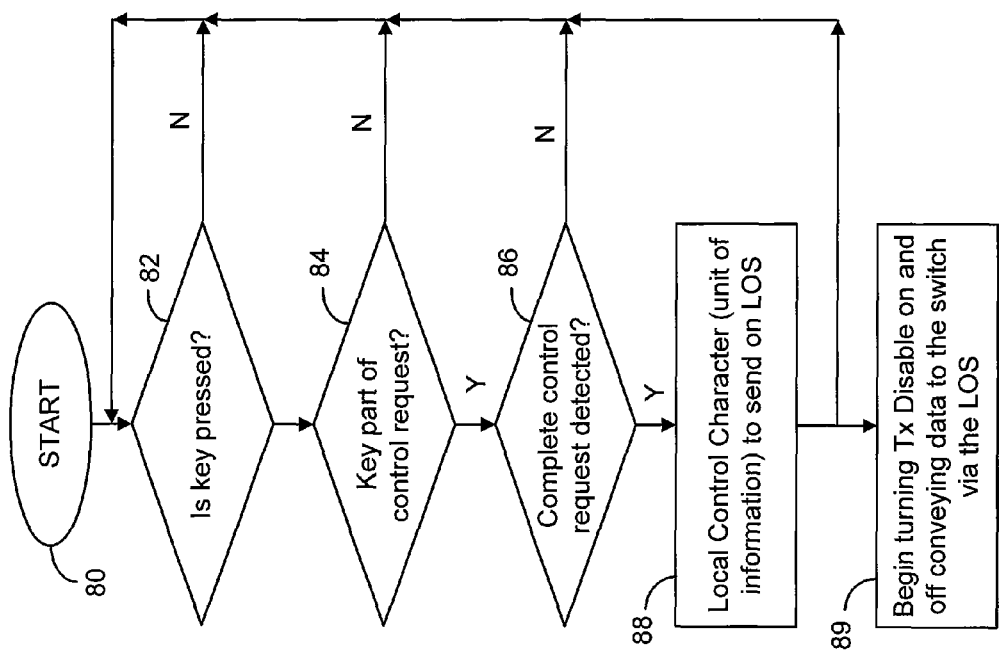
FIG. 7 is a flow chart of the operation of the I/O receiver extender in association with a local device keyboard.

FIG. 7 is a flow chart that shows one embodiment of the present invention from the perspective of local device. The routine starts at starting point 80. Decision step 82 determines if a key is pressed, such as on keyboard 22 (see FIG. 2). If a key is pressed (Y) a determination is made as to whether a part of control request has been made (decision 84). If a part of a control request has been made (decision Y), a decision is made as to whether a complete control request has been detected (decision 86).

Thus, for example, a key part of a control request is detected at decision step 84 and may be part of an overall key sequence. Only if the entire control request is detected does decision step 86 answer YES so that a unit of information (such as a control character) is loaded in the RX extender 28 for sending via toggling the TX disable line 340n and Off, and thereby to cause transceiver 29 to interrupt the communication medium 32 (turn the communication medium On and Off). For a fiber optic cable, this can be accomplished by turning the optical fiber laser or LED On and Off. For other types of communication medium, such as coaxial cable or twisted pair conductors, this can be accomplished by turning the carrier signal On and Off.

Thus, for example, if a particular complete control request is detected, such as control-A followed by control-B, the control request detected step 86 is answered affirmatively, at which point a multi-bit unit of information (e.g., a control character), such as, for example, the ASCII character for the numeral 1, is loaded in the RX extender (step 88) to in turn be sent via TX disable to turn optical fiber power On and Off (step 89).

Figure 4:
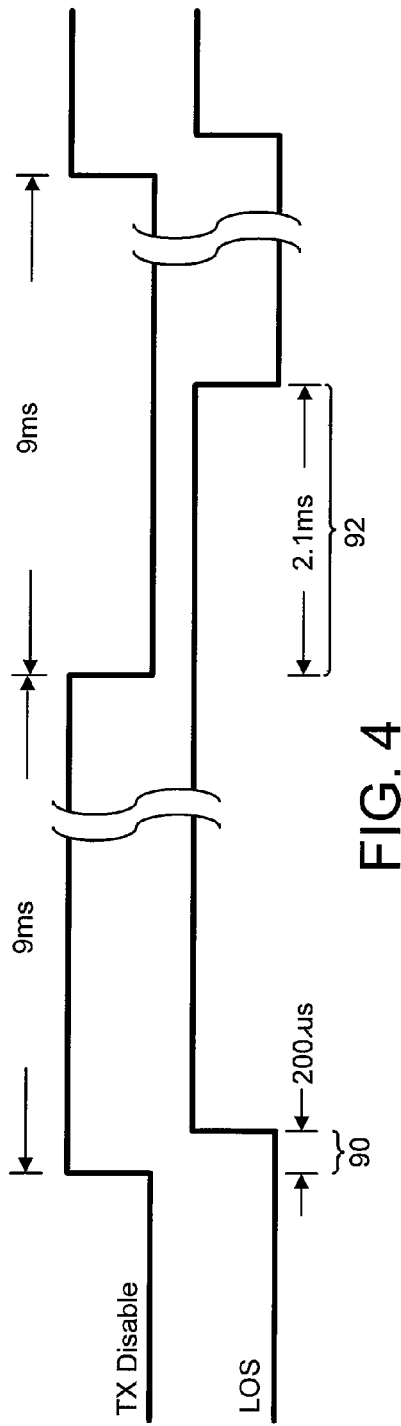
FIG. 4 is a waveform diagram illustrating the relationship between a transmit disable signal, that causes interruption of a communication medium at one end thereof, and a loss of signal (LOS) status notification as detected at a second end of the communication medium.

FIG. 4 is a typical waveform that illustrates how a unit of information is communicated, such as the above-mentioned ASCII character for the number 1. Thus, because of minimum time durations for interpreting a loss of signal (loss of optical power) on the LOS status notification pin of a receiving transceiver 29' at the KVM matrix switch 40, as well as the time duration necessary for the communication medium to be active (optical power present) for the LOS status notification to indicate such optical power present, it is necessary that the communication medium be turned On and Off at a relatively slow rate in order to convey a unit of information. Such a communication rate can be 110 baud, for example.

Typically, for specifications associated with small form factor (SFP) pluggable transceivers, there is approximately a 200 microsecond delay between the actual turn off of the communication medium (loss of optical power) and the detection of the loss of signal via the LOS status notification (LOS status notification High) at the receiving end of the communication medium. For example, if the User #1 RX extender 28 turns Off the communication medium (TX disable signal goes high), that turn off of the communication medium 32 requires at least 200 microseconds before it is detected at the SFP associated with the communication medium at its second end (connected to the matrix switch 40) (that is, LOS is true or high). This is seen in FIG. 4 as time delay 90.

In addition, there is a time delay 92 of up to 2.1 milliseconds that is required (after the communication medium becomes active—optical power present—i.e. TX disable low of off), before the LOS status notification at SFP 29' goes low (indicating that the communication medium optical power has turned on).

As seen in FIG. 4, the TX disable signal typically would have an On duration of approximately 9 milliseconds to denote an ON state (TX disable true) and a 9 millisecond low state to denote a TX disable OFF state. Multiple consecutive On or Off bits are generated by keeping TX disable Off or On respectively for multiples of this 9 millisecond time period (110 baud example). Other durations, of course, could be used as long as the interruption of the communication medium (e.g. optical power ON and optical power OFF) can be accurately detected by the loss of signal status notification 36 at the far end of the communication medium (SFP 29').

As seen in FIG. 6, the I/O card 76 associated with the KVM matrix switch 40 contains one or more transceivers 29' for receipt of communications over the communication mediums 32 from local devices 20. The loss of signal status notification 36 from transceiver 29' communicates with processor module 67'. The processor module 67' in one embodiment determines the status of the LOS status notification 36 to determine whether a bit of information has been received by the LOS status notification.

Figure 8:
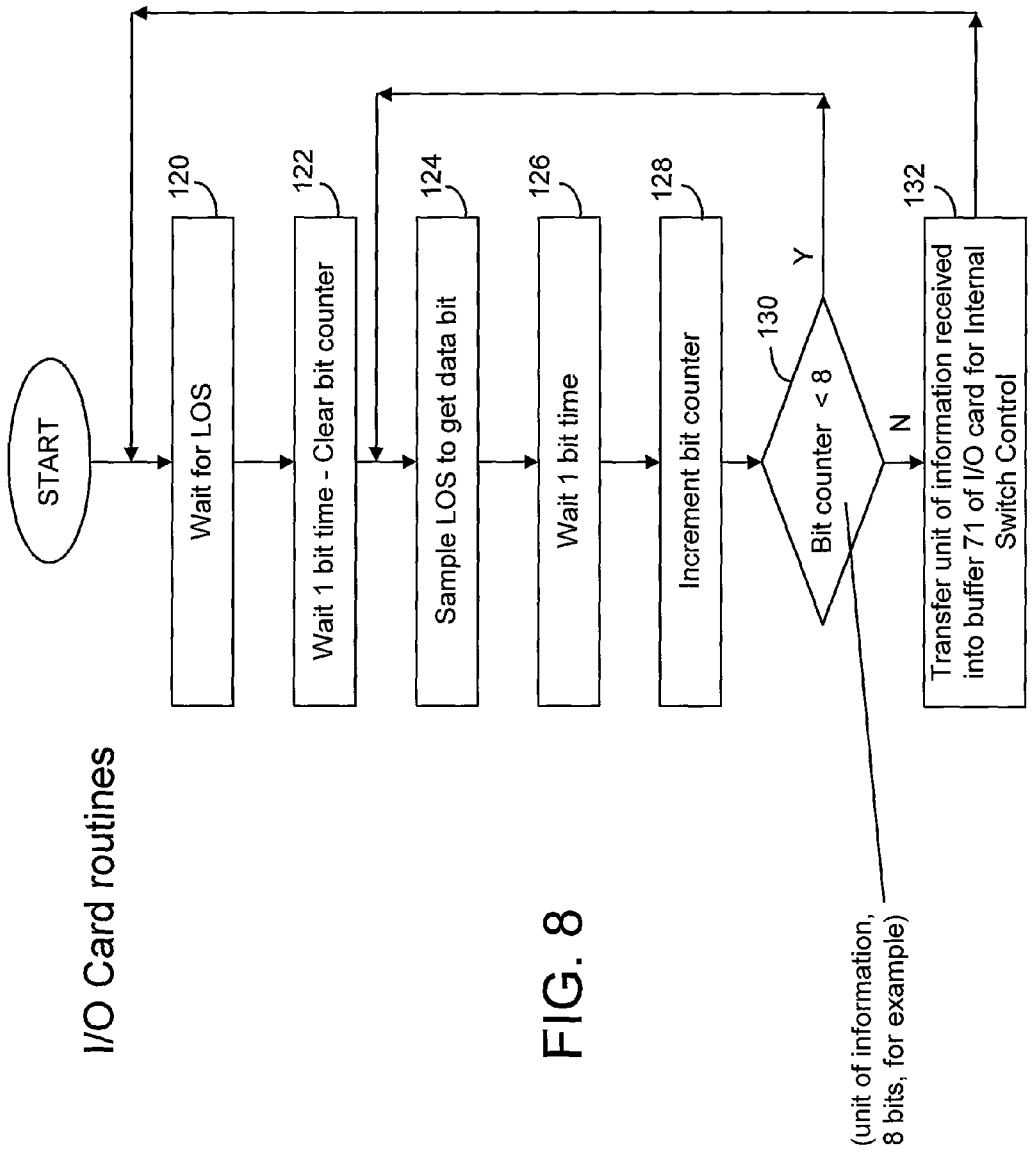
FIG. 8 is a flow chart of the operation of the I/O card associated with one of the local devices.

FIG. 8 shows a flow chart for the I/O card making the determination of whether a unit of information has been received via the LOS status notification and, if so, the unit of information stored in buffer 71 and transferred to the internal switch control 44 via control interface 78. At step 120, the routine waits for LOS status notification and at step 122 waits 1 bit time to clear a bit counter. At step 124 the LOS status notification pin is sampled one or more times to obtain one bit of information of the multi-bit unit of information (multiple sampling of the LOS status notification pin per bit time duration may help ensure reliable determination of the high or low value of the LOS status notification pin). The routine then waits one bit time at step 126, increments the bit counter at step 128 and determines if a full unit of information has been received at step 130. If a unit of information is received (step 130=N) then the unit of information is transferred at step 132 via control interface 78 to the internal switch control 44.

Figure 10:
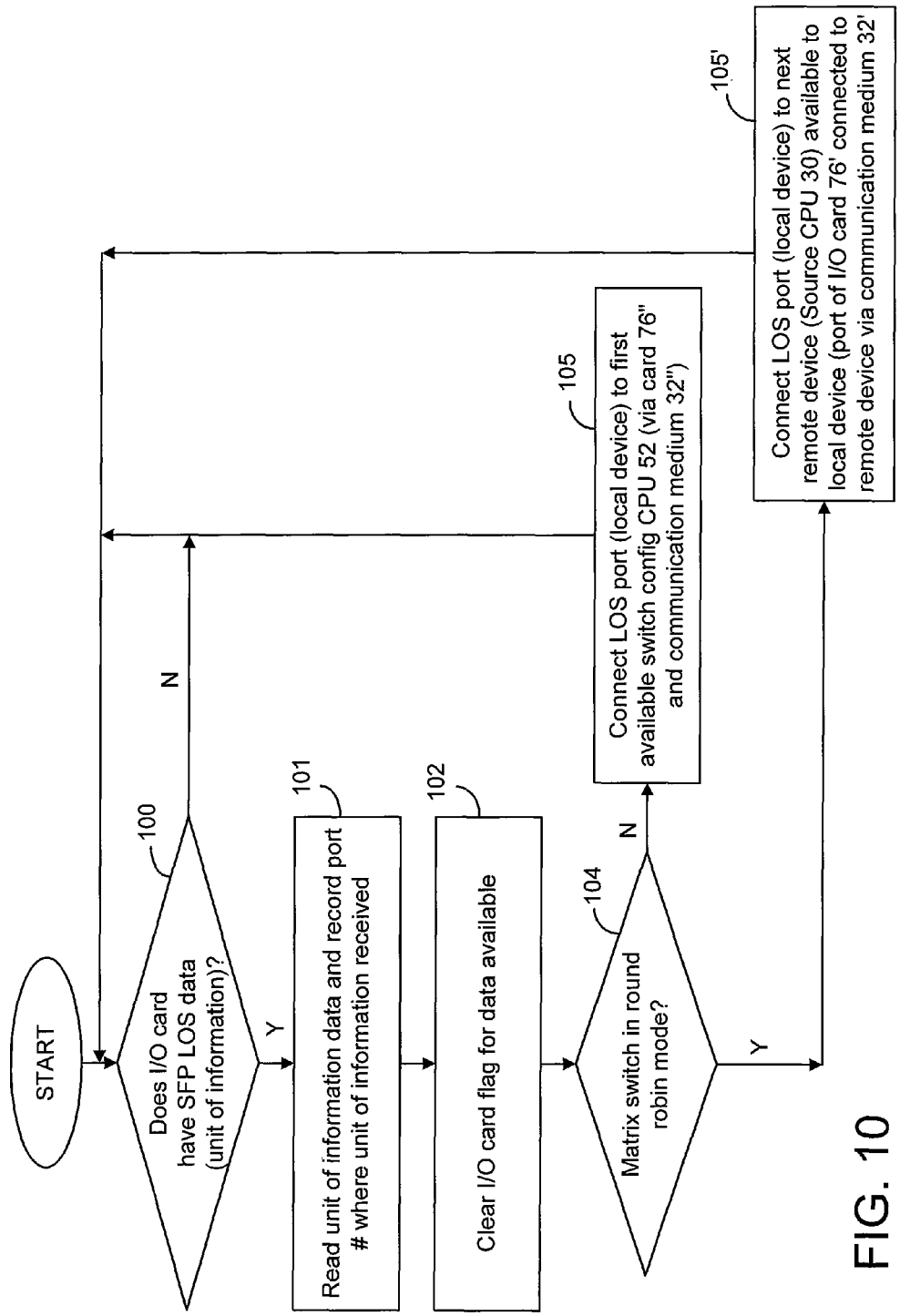
FIG. 10 is a flow chart of the switch control of the internal switch control of the KVM matrix switch.

Alternatively, as shown in FIG. 10, the processor module 67' of the I/O card at step 114 can report the status of the LOS status notification line 36 to the internal switch control 44 via control interface 78, where the internal switch control then performs the determination of receipt of the unit of information (control character) by accumulating such bits in a manner similar to that shown in the flow chart of FIG. 8.

In either embodiment, the unit of information (e.g., a control character) is conveyed from the local device 20 to the internal switch control 44 of KVM matrix switch 40 via interruption of the communication medium 32 between the local device and the KVM matrix switch.

Figure 3:
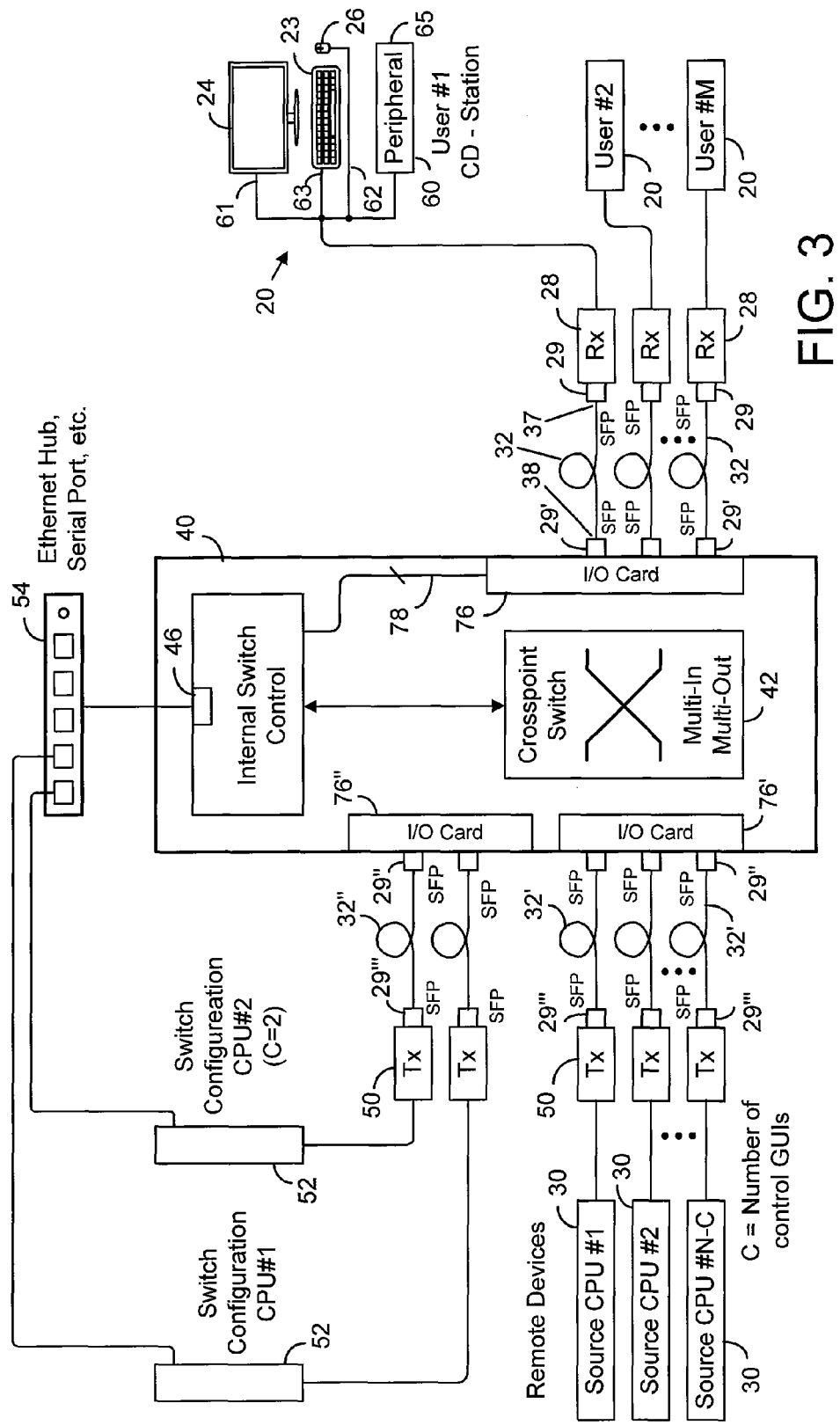
FIG. 3 is an overall architectural diagram of another embodiment of the present invention for allowing a local device (destination user) to switch from one remote device (Source CPU) to another via communication with a Switch Configuration CPU.

FIG. 6 shows details of the KVM matrix switch 40 as also shown in FIG. 2 with FIG. 10 illustrating a flow chart of the operation of the internal switch control 44 when a unit of information (e.g., control character) is received by interruption of the communication medium. Thus, at the decision step 100 a determination is made as to whether I/O card 76 has received a unit of information (control character). If it has, the unit of information received and the port of the I/O card where the unit of information was received is recorded (step 101) (I/O cards typically can have multiple SFP transceivers, each with a different port associated therewith). The I/O card flag is then cleared (step 102) and at step 104 the port is connected to the next available Source CPU 30 (step 105) or the next available Switch Configuration CPU 52 (step 105'). The former step (step 105) is selected if the KVM matrix switch 40 is in a "Round Robin" mode (FIG. 2) and the latter selected (step 105') if the KVM matrix switch is not in the "Round Robin" mode (FIG. 3). It should be noted that the step of reading the unit of information (control character) can be performed by either reading the control character at the I/O card or by the internal switch control determining that the bits received via the LOS status notification represent a unit of information (control character). The multi-in/multi-out (cross-point) switch 42 of matrix switch 40 then connects the port on which the communication medium transmitted the information unit (control character) to the next available switch configuration CPU 52 as seen in FIG. 3.

In the embodiment shown in FIG. 3 there are two Switch Configuration CPUs (Switch Configuration CPU #1 and Switch Configuration CPU #2) and thus a local device, such as User #1 that had communicated a unit of information by interruption of the communication medium, would, upon detection of the unit of information at the KVM matrix switch, be connected to the next available Switch Configuration CPU, such as Switch Configuration CPU #1, if this Switch Configuration CPU is not servicing another local device.

Once the local device is connected to a Switch Configuration CPU, it communicates therewith via the communication medium 32 using the communication medium high speed data path. The local device can then instruct the Switch Configuration CPU to cause the KVM matrix switch to control its multi-in/multi-out switch 42 for connecting the local device to any desired Source CPU 30, such as remote device Source CPU #2. To do this, the switch configuration CPU communicates via an Ethernet hub (or other communication path, e.g., RS232, RS422, etc.) to the internal switch control 44 of matrix switch 40. The internal switch control in turn controls the cross point switch 42 thereby connecting the user station (local device) to the desired Source CPU 30. The Switch Configuration CPU 52 normally provides a graphical user interface to the local device, thereby facilitating user interaction with the Switch Configuration CPU for purposes of allowing the local device to instruct the Switch Configuration CPU to select the desired Source CPU that the local device desires to communicate with.

In another embodiment, the unit of information that causes the system to switch the connection of the local device to the next available Source CPU 30 or Switch Configuration CPU 52, can be a simple On and Off toggling of the communication medium some minimum number of times over a period of time, such as toggling communication medium 320*n* and Off every 6 milliseconds for at least 18 milliseconds. Once this toggling is determined, decision step 104 can be invoked.

Figure 11:
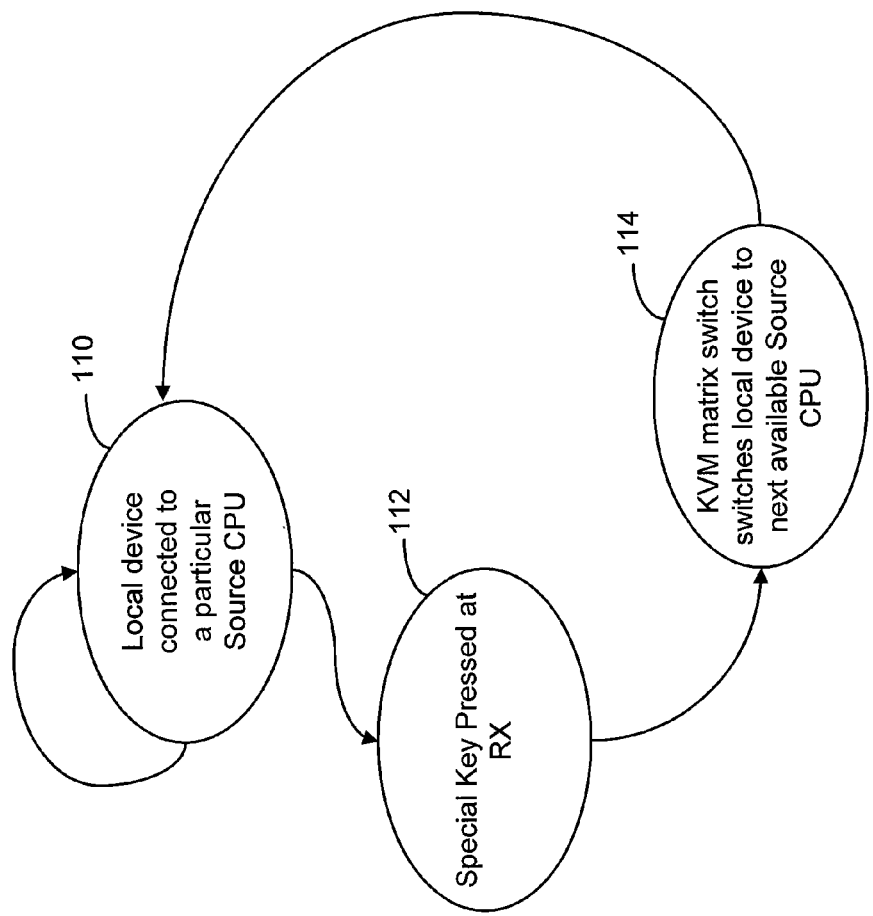
FIG. 11 is a state diagram of a local device switching connection from one remote device to another remote device.

Thus, the mode of operation of the present invention is different in at least two embodiments of the present invention. In one embodiment, as illustrated in FIGS. 2 and 11, the local device initially is in an initial state 110 in which the local device 20 (e.g., User #3) is connected to a particular Source CPU 30 (e.g., Source CPU #2). The user maintains this state until the user presses a particular control key sequence via keyboard 22. This action, denoted by reference numeral 112, causes the RX extender 28 associated with this user to connect to the next available Source CPU 30 (e.g., Source CPU #3). Thus, the user is connected via KVM matrix switch 40 (state 114) to a specific Source CPU and remains connected to that Source CPU until the user enters a control sequence via its associated keyboard 22 and if this action occurs, then the user is connected to the next available Source CPU (user port of the local device connected to next available Source CPU). To cause this to occur, the communication medium 32 between the local device and the KVM matrix switch 40 is interrupted via toggling with a bit pattern corresponding to the control character that instructs the KVM matrix switch to connect the port associated with the user to the next available Source CPU. Depending upon the value of the unit of information sent to the KVM matrix switch, the next available Source CPU could be the next sequentially higher Source CPU (for one value of the unit of information) or the next sequentially lower Source CPU (for another value of the unit of information).

FIG. 12 is a second mode of operation similar to that shown in FIG. 11, wherein the local device 20 (e.g., User #5) is connected to a specific Source CPU (state 110) (e.g., Source CPU #8) until a control sequence is entered via its associated keyboard 22 (state 112) which, if it occurs, causes the communication medium to be interrupted via toggling by the transceiver at the RX extender such that it is interrupted by a unit of information. The KVM matrix switch upon such detection of the unit of information connects the user port of this local device to the next available Switch Configuration CPU 52 (step 114'). When this change of state occurs, the local device (user) is connected to a specific Switch Configuration CPU (e.g., switch configuration CPU #2) and communicates therewith via the communication medium 32 to allow the user (local device) to instruct the Switch Configuration CPU (state 116) to command the KVM matrix switch to cause the user port to be connected to a desired particular Source CPU 30 (state 118). This desired Source CPU information is conveyed to the Switch Configuration CPU via the user, such as via the keyboard 32 associated with the user.

Thus, in one embodiment, upon detection of a unit of information (control character) via interruption of the communication medium, the KVM matrix switch connects the port associated with the particular local device (user) to the next available Source CPU.

In another embodiment, upon detection of the unit of information (control character) via interruption of the communication medium between the user and the KVM matrix switch, the KVM matrix switch causes the port associated with the particular local device to be connected to the next available Switch Configuration CPU. When the user is connected to the next available Switch Configuration CPU, it communicates therewith via the communication medium in the normal fashion and thereby instructs the Switch Configuration CPU to connect the user to a desired Source CPU.

Embodiments of the present invention provide that the unit of information communicated via interruption of the communication medium can be detected either at the I/O card of the KVM matrix switch or at the internal switch control of the KVM matrix switch While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method of communicating comprising:
    in response to a request from a local device, toggling a transmitter On and Off in a pattern to generate multiple consecutive On/Off bits having On/Off signals with a same pulse width that represents a unit of information, said transmitter configured to transmit high speed data via a communication medium at a first end thereof, the communication medium also having a second end;
    said transmitter interrupting said communication medium at said first end corresponding to said pattern, each interrupting of said communication medium at said first end resulting in a detection of a loss of signal at said second end;
    using a detection of a respective loss of signal at said second end for detecting the pattern of interruption of said communication medium at said second end so as to determine said unit of information; and
    in response to said detection, changing to which remote device of a plurality of remote devices said local device is in communication via said communication medium.

2. The method according to claim 1, wherein the transmitter is toggled via a transmit disable input of the transmitter.

3. The method according to claim 1, wherein the step of changing to which remote device of a plurality of remote devices that the local device is in communication comprises a plurality of devices ranging from 1 to N where N is a positive integer greater than 2 and wherein the changing to which device of the plurality of remote devices, said local device is in communication is to the next sequentially higher or next sequentially lower device i, where i is a positive integer from 1 to N, depending upon a value of the unit of information.

4. The method according to claim 1, wherein at least one remote device is a switch configuration device and wherein the local device is connected to the switch configuration device if said pattern is detected.

5. The method according to claim 4, wherein the switch configuration device communicates with an internal switch control of a matrix switch so as to allow the local device to select which of the plurality of remote devices it is to be in communication.

6. The method according to claim 5, wherein the local device communicates with the switch configuration device via data transmitted over the communication medium rather than via interruption of said communication medium.

7. The method according to claim 4, wherein the local device communicates with the switch configuration device via data transmitted over the communication medium rather than via interruption of said communication medium.

8. The method according to claim 1, wherein in response to said detection of the pattern of interruption of said communication medium, the local device is connected to a switch configuration device in communication with the second end of the communication medium and when connected to said switch configuration device, the local device communicates therewith so as to select the next remote device of the plurality of remote devices said local device is in communication.

9. The method according to claim 8, wherein the local device communicates with the switch configuration device by transmitting data via the communication medium rather than interruption of said communication medium.

10. The method according to claim 1, wherein the detecting the pattern of interruption of said communication medium at said second end so as to determine said unit of information is via an output signal of a receiver portion of a transceiver associated with the communication medium at its second end.

11. The method according to claim 10, wherein the transceiver is a small form factor pluggable transceiver.

12. The method according to claim 11, wherein the output signal of the transceiver is a loss of signal (LOS) output status signal of the transceiver.

13. The method according to claim 1, wherein the transmitter is part of a transceiver.

14. The method according to claim 13, wherein the transceiver has a transmit disable input and wherein the toggling of the transmit disable input changes a state of the transmit disable input for a minimum period of time necessary for interrupting the communication medium a period of time sufficient for allowing detection of said disruption at the second end of the communication medium.

15. The method according to claim 14, wherein said toggling of the transmit disable input for a sufficiently long period of time so as to allow for its detection at the second end of the communication medium as a bit of information of said unit of information.

16. The method according to claim 1, wherein the unit of information is an On and Off sequence that repeats for a minimum amount of times.

17. The method according to claim 1, wherein the steps are repeated for a plurality of local devices each communicating via a communication medium with one of said plurality of remote devices.

18. The method according to claim 1, wherein the same pulse width is 9 milliseconds.

19. The method according to claim 1, wherein the method of communicating comprises a method of communicating via a KVM matrix switch, wherein the second end of the communication medium is disposed at the KVM matrix switch, and wherein the KVM matrix switch facilitates the changing to which remote device the local device is in communication with.

20. An input/output (I/O) extender comprising:
a transmitter, and
an input module configured to receive a control request to change to which remote device of a plurality of remote devices a local device is in communication via a communication medium, said input module configured to toggle said transmitter On and Off in a pattern to generate multiple consecutive On/Off bits having On/Off signals with a same pulse width that represents a unit of information upon receipt of the control request from said local device;
wherein said transmitter is connected to a first end of said communication medium and is configured to transmit high speed data via said communication medium to a second end of said communication medium, said transmitter in response to said toggling, interrupting said communication medium corresponding to said pattern, each interrupting of said communication medium at said first end configured to result in a detection of a loss of signal at said second end.

21. The I/O extender according to claim 20, wherein the input module further comprises a transmitter disable input for receipt of said control request.

22. The I/O extender according to claim 20, wherein the unit of information has a value to cause a matrix switch to connect the I/O extender to a second remote device different from a remote device to which the I/O extender is in communication prior to transmission of said unit of information.

23. The I/O extender according to claim 20, further wherein the transmitter is part of a transceiver connected to said communication medium.

24. The I/O extender according to claim 20, wherein the same pulse width is 9 milliseconds.

25. The I/O extender according to claim 20, wherein the second end of the communication medium is disposed at a KVM matrix switch, and wherein the KVM matrix switch is configured to facilitate the change to which remote device the local device is in communication with.

26. A communication system comprising:
the I/O extender of claim 20, and
a matrix switch, comprising,
a receiver configured to receive said high speed data via said communication medium at a second end thereof and having a loss of signal (LOS) status notification configured to detect interruption of said communication medium;
an input module in communication with the LOS status notification and configured to detect said unit of information corresponding to the pattern of the detected interruption of said communication medium;
a crosspoint switch, and
a switch control in communication with said LOS status notification and configured to cause the crosspoint switch to change which remote device of a plurality of remote devices said local device is in communication.

27. The communication system according to claim 26, further comprising a switch configuration device remote device, wherein said switch control causes the crosspoint switch to cause the local device to communicate with said switch configuration device upon detection of said unit of information.

28. The communication system according to claim 27, wherein the switch configuration device is configured to allow the local device to select which remote device it desires to communicate with, the switch configuration device configured to communicate such a selection to the matrix switch to cause the local device to be in communication with the selected remote device.

29. The communication system according to claim 26, wherein the receiver is part of a transceiver.

30. A transmitter comprising:
a transmit disable input configured to be toggled On and Off in a pattern to generate multiple consecutive On/Off bits having On/Off signals with a same pulse width that represents a unit of information, said transmitter configured to transmit high speed data via a communication medium having a first end and a second end; and
an input module in communication with the transmit disable input, said input module configured, in response to said toggling of the transmit disable input, to interrupt said communication medium corresponding to said pattern in order to change to which remote device of a plurality of remote devices a local device is in communication via said communication medium, each interruption of said communication medium at said first end configured to result in a detection of a loss of signal at said second end.

31. The transmitter according to claim 30, wherein the transmitter is part of a transceiver.

32. The transmitter according to claim 30, wherein the same pulse width is 9 milliseconds.

33. The transmitter according to claim 30, wherein the second end of the communication medium is disposed at a KVM matrix switch, and wherein the KVM matrix switch is configured to facilitate the change to which remote device the local device is in communication with.

* * * * *